(12) United States Patent
Tsuji

(10) Patent No.: US 12,571,700 B2
(45) Date of Patent: Mar. 10, 2026

(54) ABNORMALITY DETECTION SYSTEM, ABNORMALITY DETECTION METHOD, AND COMPUTER READABLE MEDIUM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 18/023,453

(22) PCT Filed: Sep. 9, 2020

(86) PCT No.: PCT/JP2020/034083
§ 371 (c)(1),
(2) Date: Feb. 27, 2023

(87) PCT Pub. No.: WO2022/054163
PCT Pub. Date: Mar. 17, 2022

(65) Prior Publication Data
US 2023/0332977 A1     Oct. 19, 2023

(51) Int. Cl.
*G01M 5/00* (2006.01)

(52) U.S. Cl.
CPC ........ *G01M 5/0033* (2013.01); *G01M 5/0025* (2013.01); *G01M 5/0091* (2013.01)

(58) Field of Classification Search
CPC . G01M 5/0033; G01M 5/0025; G01M 5/0091
See application file for complete search history.

(56) References Cited

U.S. PATENT DOCUMENTS

2002/0146172 A1* 10/2002 Nair ........................ G06V 10/42
382/291
2005/0219551 A1* 10/2005 Eriguchi .............. G01B 11/005
356/601
(Continued)

FOREIGN PATENT DOCUMENTS

JP     2017-162452 A     9/2017
JP     2018-071973 A     5/2018
(Continued)

OTHER PUBLICATIONS

International Search Report for PCT Application No. PCT/JP2020/034083, mailed on Dec. 1, 2020.
(Continued)

*Primary Examiner* — Lina Cordero
*Assistant Examiner* — Lyudmila Zaykova-Feldman
(74) *Attorney, Agent, or Firm* — Sughrue Mion PLLC

(57)     ABSTRACT

An abnormality detection system includes: shape data acquisition means for acquiring shape data of a surface of a structure; surface direction calculation means for calculating a direction in which the surface is facing based on the shape data; shape data division means for dividing the shape data based on the direction in which the surface is facing calculated by the surface direction calculation means; reference shape calculation means for calculating a reference shape for each of the pieces of the shape data divided by the shape data division means; and abnormality detection means for detecting an abnormality on the surface of the structure based on a difference between each of the pieces of the shape data divided by the shape data division means and the reference shape corresponding to each of the pieces of the shape data calculated by the reference shape calculation means.

7 Claims, 8 Drawing Sheets

1 ABNORMALITY DETECTION SYSTEM

(56)     References Cited

U.S. PATENT DOCUMENTS

| | | | | |
|---|---|---|---|---|
| 2005/0263727 A1* | 12/2005 | Noda | .................... | G01B 5/008 |
| | | | | 250/559.29 |
| 2018/0017954 A1* | 1/2018 | Noda | .................... | G01B 21/20 |
| 2018/0321382 A1* | 11/2018 | Zweigle | ................ | G05D 1/024 |
| 2019/0154806 A1 | 5/2019 | Zweigle et al. | | |
| 2020/0355491 A1* | 11/2020 | Van Weeren | .......... | G01B 11/16 |
| 2021/0223368 A1* | 7/2021 | Zweigle | ............... | G01S 7/4865 |

FOREIGN PATENT DOCUMENTS

| | | | |
|---|---|---|---|
| JP | 2019-117188 | A | 7/2019 |
| JP | 6664569 | B1 | 3/2020 |

OTHER PUBLICATIONS

Written opinion for PCT Application No. PCT/JP2020/034083, mailed on Dec. 1, 2020.

* cited by examiner

<u>1</u>  ABNORMALITY DETECTION SYSTEM

BOTTOM SURFACE OF ARCH

SIDE SURFACE OF ARCH

CEILING SURFACE OF ARCH

DIVIDE

START

ACQUIRE SHAPE DATA OF
WALL SURFACE OF STRUCTURE ~ S101

CALCULATE SURFACE DIRECTION
OF STRUCTURE ~ S102

DIVIDE SHAPE DATA OF STRUCTURE ~ S103

CALCULATE REFERENCE SHAPE
FOR EACH AREA OF STRUCTURE ~ S104

CALCULATE DIFFERENCE BETWEEN
DIVIDED SHAPE DATA AND
REFERENCE SHAPE ~ S105

DETECT AREA OF SHAPE DATA WHERE
DIFFERENCE EXCEEDS THRESHOLD
AS ABNORMALITY ~ S106

END (a)          (b)          (c)          (d)

ABNORMALITY DETECTION SYSTEM, ABNORMALITY DETECTION METHOD, AND COMPUTER READABLE MEDIUM

This application is a National Stage Entry of PCT/JP2020/ 034083 filed on Sep. 9, 2020, the contents of all of which are incorporated herein by reference, in their entirety.

TECHNICAL FIELD

The present invention relates to an abnormality detection system, an abnormality detection method, and a computer readable medium that detect abnormalities on the surface of a structure.

BACKGROUND ART

Abnormality detection systems that detect abnormalities on the surface of a structure by acquiring shape data of the surface of the structure and comparing the acquired shape data with a reference shape corresponding to the shape data are known (see Patent Literature 1 and 2).

CITATION LIST

Patent Literature

Patent Literature 1: Japanese Unexamined Patent Application Publication No. 2019-117188
Patent Literature 2: Japanese Patent No. 6664569

SUMMARY OF INVENTION

Technical Problem

Incidentally, for example, a structure such as an arch part of a tunnel has various cross-sectional shapes as shown in FIG. 8, and is not necessarily curved at a constant curvature. Therefore, an error between shape data and a reference shape becomes large depending on a change in curvature of the surface of the structure, and there is thus a possibility that not all of abnormalities on the surface of the structure will be detected.

An object of the present disclosure is to provide an abnormality detection system, an abnormality detection method, and a computer readable medium that solve at least one of the above-described problems.

Solution to Problem

In order to achieve the above-described object, an example aspect is an abnormality detection system including:

shape data acquisition means for acquiring shape data of a surface of a structure;

surface direction calculation means for calculating a direction in which the surface is facing based on the shape data acquired by the shape data acquisition means;

shape data division means for dividing the shape data based on the direction in which the surface is facing calculated by the surface direction calculation means;

reference shape calculation means for calculating a reference shape for each of the pieces of the shape data divided by the shape data division means; and abnormality detection means for detecting an abnormality on the surface of the structure based on a difference between each of the pieces of the shape data divided by the shape data division means and the reference shape corresponding to each of the pieces of the shape data calculated by the reference shape calculation means.

In order to achieve the above-described object, an example aspect may be an abnormality detection method including:

acquiring shape data of a surface of a structure;

calculating a direction in which the surface is facing based on the acquired shape data;

dividing the shape data based on the calculated direction in which the surface is facing;

calculating a reference shape for each of the divided pieces of the shape data; and detecting an abnormality on the surface of the structure based on a difference between each of the divided pieces of the shape data and the calculated reference shape corresponding to each of the pieces of the shape data.

In order to achieve the above-described object, an example aspect may be a non-transitory computer readable medium storing a program for causing a computer to perform:

a process of acquiring shape data of a surface of a structure;

a process of calculating a direction in which the surface is facing based on the acquired shape data;

a process of dividing the shape data based on the calculated direction in which the surface is facing;

a process of calculating a reference shape for each of the divided pieces of the shape data; and a process of detecting an abnormality on the surface of the structure based on a difference between each of the divided pieces of the shape data and the calculated reference shape corresponding to each of the pieces of the shape data.

Advantageous Effects of Invention

According to the present disclosure, it is possible to provide an abnormality detection system, an abnormality detection method, and a computer readable medium that solve at least one of the above-described problems.

EXAMPLE EMBODIMENT

First Example Embodiment

Example embodiments according to the present invention will be described hereinafter with reference to the drawings. An abnormality detection system according to this example embodiment detects deterioration abnormalities such as collapses, honeycombs, cracks, and the like that occur on the surface of a structure such as a tunnel, a road, a bridge, and a building.

Figure 1:
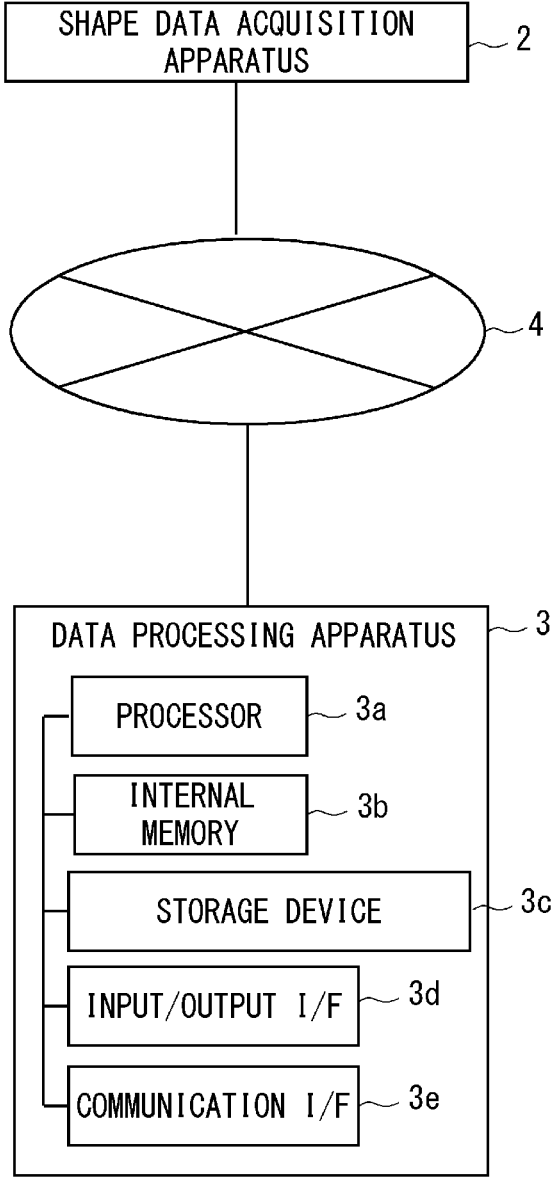
FIG. 1 is a block diagram showing a schematic system configuration of an abnormality detection system according to an example embodiment.

FIG. 1 is a block diagram showing a schematic system configuration of the abnormality detection system according to this example embodiment. An abnormality detection system 1 according to this example embodiment includes a shape data acquisition apparatus 2 and a data processing apparatus 3. The shape data acquisition apparatus 2 may be connected to the data processing apparatus 3 for communication through a communication network 4 such as a Wide Area Network (WAN) or a Local Area Network (LAN). The shape data acquisition apparatus 2 and the data processing apparatus 3 may be integrally formed.

The shape data acquisition apparatus 2 is a specific example of shape data acquisition means. The shape data acquisition apparatus 2 acquires shape data of the wall surface of a structure. The shape data is three-dimensional point cloud data showing the shape of, for example, the inner wall surface of a tunnel.

The shape data acquisition apparatus 2 is configured as an optical sensor such as a LiDAR (Light Detection and Ranging) and a laser scanner. The LiDAR can measure the distance between the shape data acquisition apparatus 2 and the wall surface of a structure or specify the property of the wall surface of the structure by, for example, scanning and irradiating the wall surface of the structure with a laser beam to observe scattered light and reflected light. The shape data acquisition apparatus 2 may acquire shape data of a structure stored in advance in a storage device or the like. The shape data acquisition apparatus 2 transmits the acquired shape data to the data processing apparatus 3.

Figure 2:
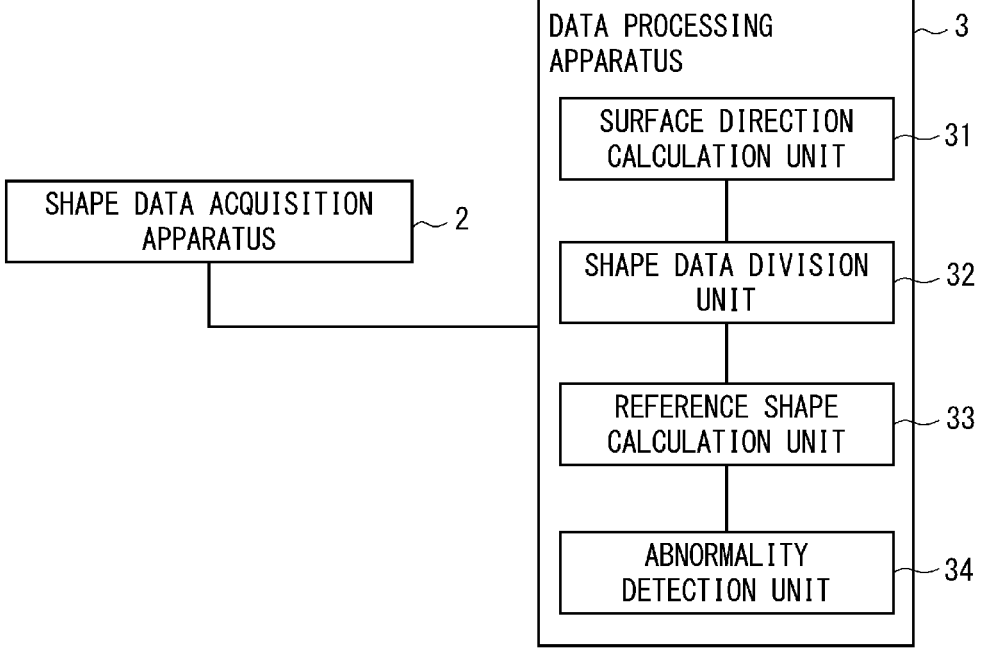
FIG. 2 is a block diagram showing a schematic system configuration of a data processing apparatus according to the example embodiment.

FIG. 2 is a block diagram showing a schematic system configuration of the data processing apparatus according to this example embodiment. The data processing apparatus 3 according to this example embodiment includes a surface direction calculation unit 31 that calculates a surface direction of a structure, a shape data division unit 32 that divides shape data of the structure, a reference shape calculation unit 33 that calculates a reference shape, and an abnormality detection unit 34 that detects abnormalities on the surface of the structure.

The data processing apparatus 3 has, for example, a hardware configuration of a normal computer including a processor 3a such as a Central Processing Unit (CPU) or a Graphics Processing Unit (GPU), an internal memory 3b such as a Random Access Memory (RAM) and a Read Only Memory (ROM), a storage device 3c such as a Hard Disk Drive (HDD) or a Solid State Drive (SSD), an input/output I/F 3d for connecting a peripheral device such as a display, and a communication I/F 3e for communicating with a device located outside the data processing apparatus.

By the data processing apparatus 3, it is possible to implement the function of each unit described later by, for example, having the processor 3a execute a program stored in the storage device 3c, the internal memory 3b, or the like while using the internal memory 3b.

The surface direction calculation unit 31 is a specific example of surface direction calculation means. The surface direction calculation unit 31 calculates a surface direction in which the surface of a structure is facing based on shape data of the structure acquired by the shape data acquisition apparatus 2. The surface direction calculation unit 31 calculates, for example, a normal vector of the surface of the structure as the surface direction of the structure based on the shape data acquired by the shape data acquisition apparatus 2.

The shape data division unit 32 is a specific example of shape data division means. The shape data division unit 32 divides shape data of the structure acquired by the shape data acquisition apparatus 2 into a plurality of preset areas based on the surface direction calculated by the surface direction calculation unit 31.

The shape data division unit 32 may divide the shape data into areas by determining whether or not a horizontal component or a vertical component of the normal vector calculated by the surface direction calculation unit 31 has exceeded a threshold. As the threshold, an optimum value that is experimentally determined may be set in advance in the shape data division unit 32. The shape data division unit 32 may divide the shape data into areas based on a percentage of the horizontal component and a percentage of the vertical component of the normal vector calculated by the surface direction calculation unit 31.

Figure 3:
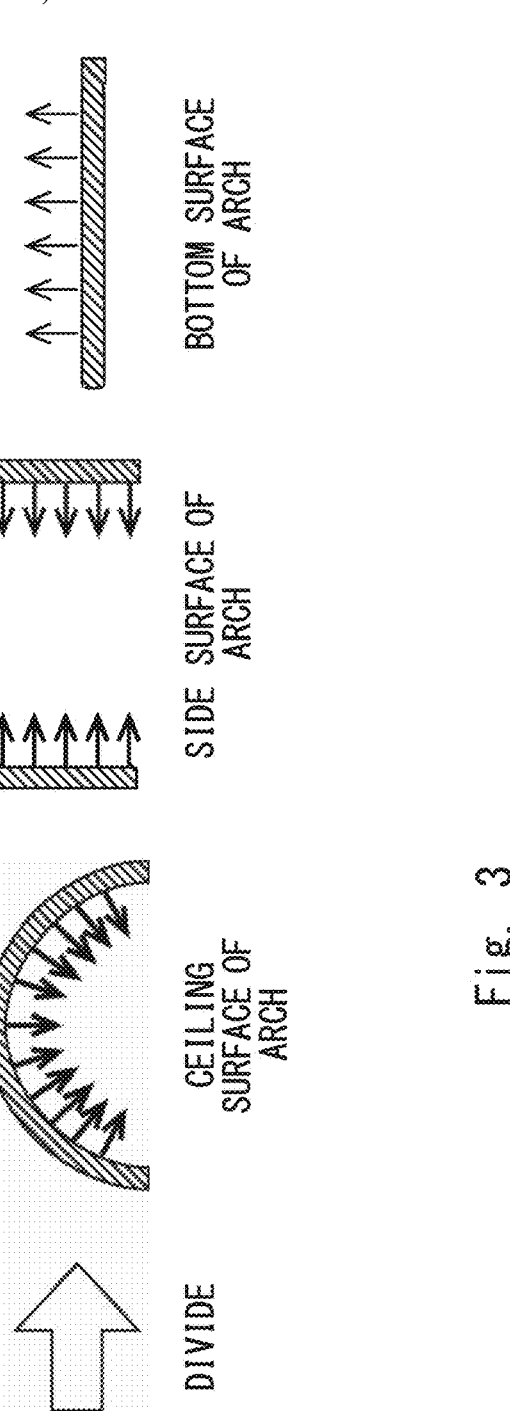
FIG. 3 is a diagram showing a divided inner wall surface of a tunnel.
Figure 3:
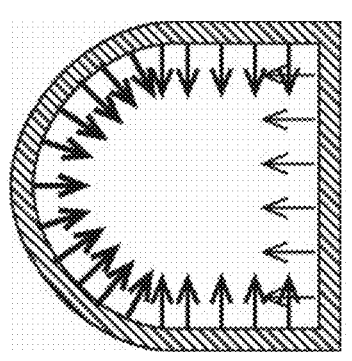

For example, as shown in FIG. 3, it is assumed that shape data of a structure is data showing the inner wall surface of a tunnel. The shape data division unit 32 divides shape data of the tunnel acquired by the shape data acquisition apparatus 2 into two areas; that is, the side surface of the arch and the ceiling surface of the arch, based on the horizontal component and the vertical component of the normal vector calculated by the surface direction calculation unit 31.

Note that the shape data division unit 32 may divide the shape data of the tunnel acquired by the shape data acquisition apparatus 2 into three areas; that is, the side surface of the arch, the ceiling surface of the arch, and the bottom surface of the arch. Further, the number of areas into which the shape data is divided may be any number.

The reference shape calculation unit 33 is a specific example of reference shape calculation means. The reference shape calculation unit 33 calculates a reference shape for each area of the shape data divided by the shape data division unit 32. The reference shape calculation unit 33 calculates, as the reference shape, an approximate plane or an approximate curved surface for each area of the shape data divided by the shape data division unit 32.

The reference shape calculation unit 33 may calculate, as the reference shape, an approximate straight line or an approximate curve for each area of the shape data divided by the shape data division unit 32. For example, the reference shape calculation unit 33 projects a three-dimensional point cloud of the shape data onto a plane for each divided area and calculates an approximate straight line or an approximate curve of the projected point cloud.

More specifically, among the three-dimensional point clouds included in the areas of the shape data, the reference shape calculation unit 33 projects a three-dimensional point cloud present within a set distance from an orthogonal plane, which is a plane perpendicular to a tunnel axis direction, onto the orthogonal plane, and performs straight line approximation or curve approximation on the projected point cloud.

Further, the reference shape calculation unit 33 may calculate the reference shape as an approximate expression as follows. For example, it is assumed that shape data is point cloud data of the inner wall surface of a tunnel. First, the reference shape calculation unit 33 calculates a distance from the shape data acquisition apparatus 2 to each point included in the point cloud data of each area divided by the shape data division unit 32.

The reference shape calculation unit 33 divides the point cloud data of each area into small pieces in the axial direction of the tunnel, for example, at predetermined intervals such as 1 cm or 5 cm in the vertical direction. The reference shape calculation unit 33 calculates an average value of the distances from the shape data acquisition apparatus 2 to each of the points included in the divided point cloud of each area in which the coordinates in the vertical direction are approximately the same.

This is because when the point cloud data is divided in the vertical direction (in the Y-axis direction), a plurality of points having approximately the same Y-coordinate values are present. Note that, instead of the average value of the distances from the shape data acquisition apparatus 2 to each of the above-mentioned points, the reference shape calculation unit 33 may calculate an intermediate value of the distance or the like as a representative value.

Figure 4:
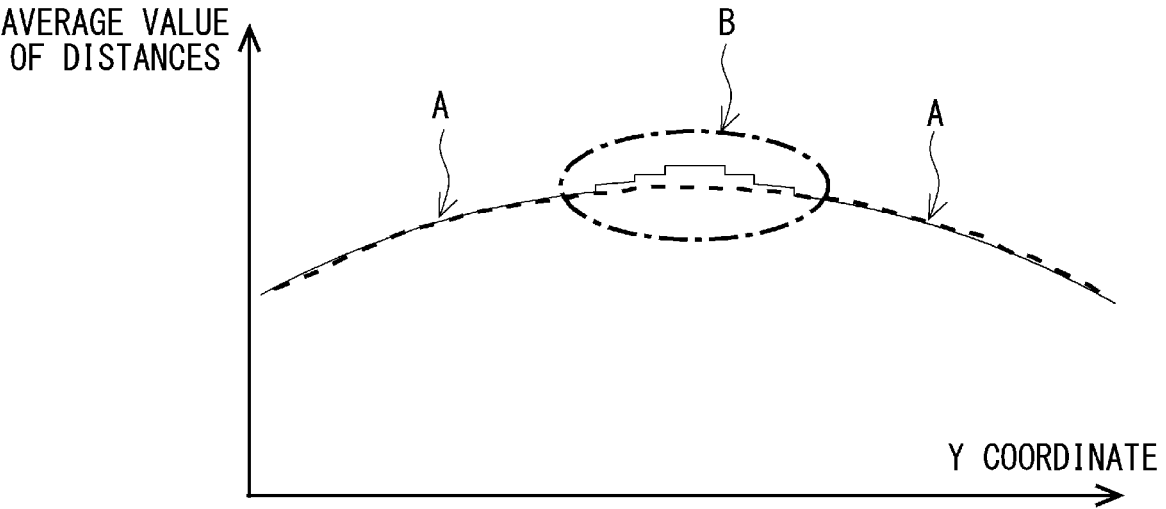
FIG. 4 is a diagram showing an example of a graph showing a relation between coordinates of each point in a vertical direction and a calculated average value of distances from a shape data acquisition apparatus to each of the points.

The reference shape calculation unit 33 generates a graph showing a relation between the coordinates of each point in the vertical direction and the calculated average value of the distances from the shape data acquisition apparatus 2 to each of the above-mentioned points. FIG. 4 is a diagram showing an example of the graph showing the relation between the coordinates of each point in the vertical direction and the calculated average value of the distances from the shape data acquisition apparatus 2 to each of the above-mentioned points.

In this graph, the horizontal axis is defined as a coordinate (Y coordinate value) in the vertical direction of each point and the vertical axis is defined as an average value of the distances from the shape data acquisition apparatus 2 to each of the above-mentioned points. In the generated graph, the reference shape calculation unit 33 calculates an approximate expression for the real data line showing the change in the average value of the distances from the shape data acquisition apparatus 2 to each of the above-mentioned points as the reference shape. In FIG. 4, the real data line is indicated by a solid line, and the line of the approximate expression is indicated by a dotted line.

The abnormality detection unit 34 is a specific example of abnormality detection means. The abnormality detection unit 34 detects an abnormality on the surface of a structure based on a difference between each shape data divided by the shape data division unit 32 and the reference shape corresponding to each shape data calculated by the reference shape calculation unit 33.

The abnormality detection unit 34 calculates the above difference by using, for example, a least squares method, and detects an abnormality on the surface of the structure. The abnormality detection unit 34 may calculate a least square error of each shape data divided by the shape data division unit 32 and the reference shape corresponding to each shape data calculated by the reference shape calculation unit 33. The abnormality detection unit 34 detects an area of the shape data where the calculated least square error exceeds a threshold as an abnormality.

For example, as shown in FIG. 4, the abnormality detection unit 34 calculates a difference between the approximate expression of the graph calculated by the reference shape calculation unit 33 and the real data line. The abnormality detection unit 34 detects an area of the shape data where the calculated difference becomes positive and exceeds a threshold as an abnormality.

As shown in A in FIG. 4, the distance from the shape data acquisition apparatus 2 to the arch part of the tunnel changes gradually when there is no abnormality, such as a collapse, in the arch part. On the other hand, as shown in B in FIG. 4, when the wall surface of the arch part is peeled off or chipped due to a collapse etc., the value of the real data line becomes larger than that of the approximate expression.

Note that although the reference shape calculation unit 33 generates a graph using the distances from the shape data acquisition apparatus 2 to each of the points and then calculates an approximate expression as described above, the present disclosure is not limited thereto. The reference shape calculation unit 33 may generate a graph using a reflected luminance value and then calculate an approximate expression instead of using the distances from the shape data acquisition apparatus 2 to each of the points.

After that, like in the above case, the abnormality detection unit 34 calculates a difference between the approximate expression of the graph calculated by the reference shape calculation unit 33 and the real data line. The abnormality detection unit 34 detects an area of the shape data where the calculated difference becomes positive and exceeds a threshold as an abnormality. As described above, by using the reflected luminance value instead of using the distance when an approximate shape is calculated, it is possible not only to detect an abnormality, such as a collapse, in which a shape changes, but also to detect an abnormality, such as a crack, in which a shape does not change greatly and a luminance changes.

The reflected luminance value is acquired by a light sensor, such as a LiDAR. The reflected luminance value is reduced as the distance from the shape data acquisition apparatus 2 to the point increases. Therefore, it is not desirable to divide point cloud data in the same direction as a beam irradiation direction of the shape data acquisition apparatus 2, while it is desirable to divide point cloud data in a direction perpendicular to the beam irradiation direction.

Figure 8:
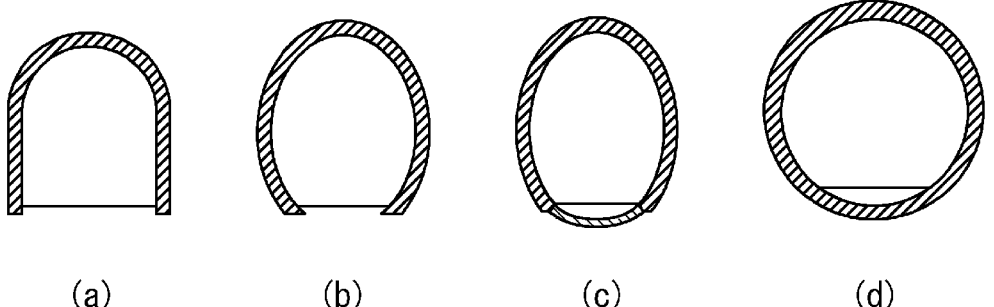
FIG. 8 is a diagram showing a cross-sectional shape of the arch part of the tunnel.

Incidentally, for example, a structure such as an arch of a tunnel has various cross-sectional shapes as shown in FIG. 8, and does not necessarily curve at a constant curvature. Therefore, an error between shape data and a reference shape becomes large depending on a change in curvature of the surface of the structure, and there is thus a possibility that not all of abnormalities on the surface of the structure will be detected.

In order to address the above problem, as described above, the abnormality detection system 1 according to this example embodiment divides shape data of the surface of a structure in accordance to its curvature and calculates an optimum reference shape corresponding to the divided shape data. Then, the abnormality detection system 1 calculates a difference between the divided shape data and the corresponding reference shape and detects the area of the shape data where the calculated difference exceeds a threshold as an abnormality. By the above configuration, a highly accurate reference shape corresponding to the curvature of the surface of the structure can be calculated. As a result, it is possible to reduce an error between the shape data and the reference shape and prevent a failure that all abnormalities on the surface of the structure cannot be detected.

Figure 5:
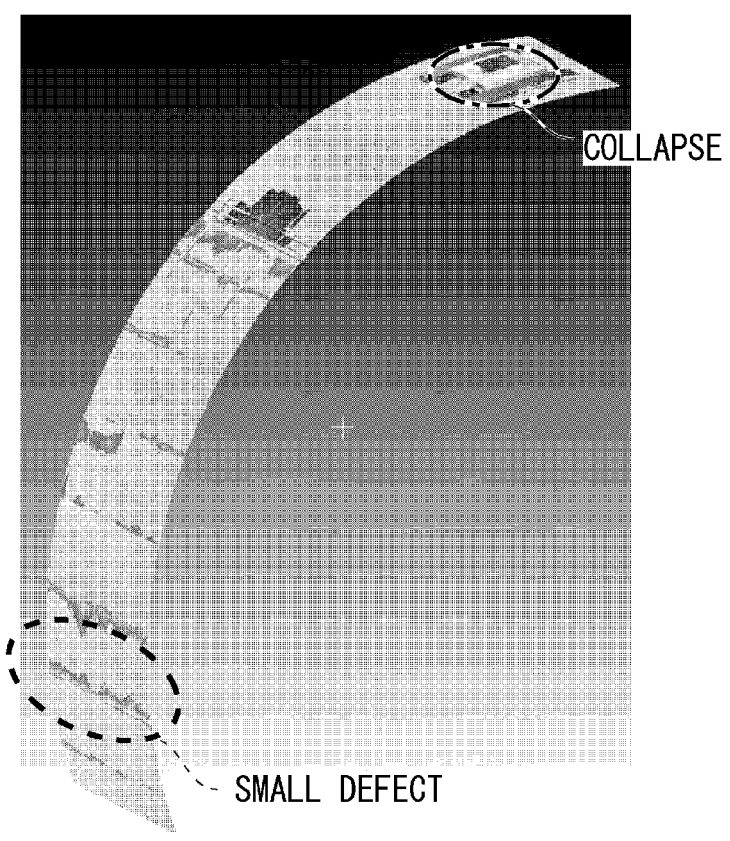
FIG. 5 is a diagram showing a result of detection of an abnormality in an arch part of a tunnel by the abnormality detection system according to the example embodiment.

FIG. 5 is a diagram showing a result of detection of an abnormality in an arch part of a tunnel by the abnormality detection system according to this example embodiment.

Note that the shape data division unit 32 has divided tunnel shape data into two areas; that is, the side surface of the arch and the ceiling surface of the arch. As shown in FIG. 5, it can be seen that the abnormality detection system 1 according to this example embodiment can accurately detect not only the collapse of the ceiling surface of the arch but also the abnormality of a small defect of the concrete surface by calculating a highly accurate reference shape corresponding to the curvature of the surface of the structure.

Figure 6:
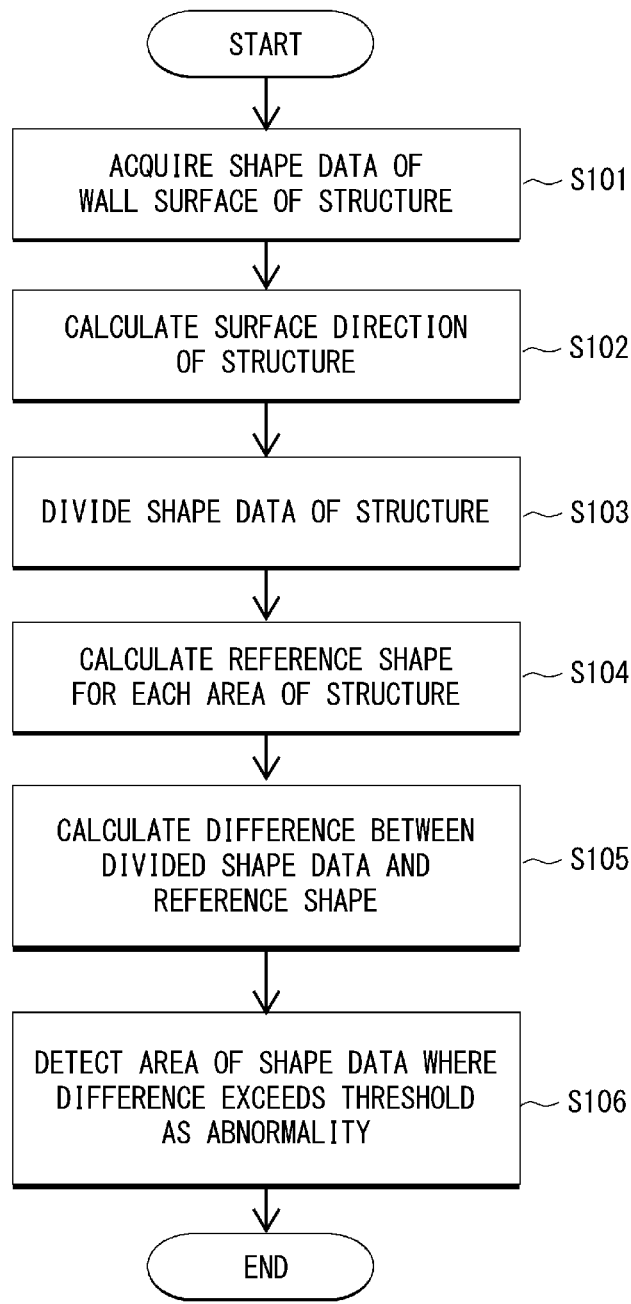
FIG. 6 is a flowchart showing an example of a flow of an abnormality detection method according to the example embodiment.

Next, an abnormality detection method according to this example embodiment will be described. FIG. 6 is a flowchart showing an example of a flow of the abnormality detection method according to this example embodiment.

The shape data acquisition apparatus 2 acquires shape data of the wall surface of a structure (Step S101). The shape data acquisition apparatus 2 transmits the acquired shape data to the data processing apparatus 3.

The surface direction calculation unit 31 of the data processing apparatus 3 calculates a surface direction in which the surface of the structure is facing based on the shape data of the structure acquired by the shape data acquisition apparatus 2 (Step S102). The surface direction calculation unit 31 transmits the calculated surface direction to the shape data division unit 32.

The shape data division unit 32 divides the shape data of the structure acquired by the shape data acquisition apparatus 2 into a plurality of preset areas based on the surface direction received from the surface direction calculation unit 31 (Step S103).

The reference shape calculation unit 33 calculates a reference shape for each area of the shape data divided by the shape data division unit 32 (Step S104). The reference shape calculation unit 33 transmits the calculated reference shape for each area of the shape data to the abnormality detection unit 34.

The abnormality detection unit 34 calculates a difference between each shape data divided by the shape data division unit 32 and the reference shape corresponding to each area of the shape data calculated by the reference shape calculation unit 33 (Step S105). The abnormality detection unit 34 detects the area of the shape data where the calculated difference becomes positive and exceeds a threshold as an abnormality (Step S106).

Note that, in the above example embodiment, although a case has been described in which the abnormality detection system 1 detects abnormalities such as collapse that occur on the inner wall surface of a tunnel, the abnormality detection system 1 can similarly detect deterioration abnormalities that occur on the surface of a structure having a curved surface, such as a road, a bridge, and a building.

As described above, the abnormality detection system 1 according to this example embodiment includes the shape data acquisition apparatus 2 that acquires shape data of the surface of a structure, the surface direction calculation unit 31 that calculates a surface direction based on the shape data acquired by the shape data acquisition apparatus 2, the shape data division unit 32 that divides the shape data based on the surface direction calculated by the surface direction calculation unit 31, the reference shape calculation unit 33 that calculates a reference shape for each shape data divided by the shape data division unit 32, and the abnormality detection unit 34 that detects an abnormality on the surface of the structure based on a difference between each shape data divided by the shape data division unit 32 and the reference shape corresponding to each shape data calculated by the reference shape calculation unit 33. By the above configuration, a highly accurate reference shape corresponding to the curvature of the surface of the structure can be calculated. As a result, it is possible to reduce an error between the shape data and the reference shape and prevent a failure that all abnormalities on the surface of the structure cannot be detected.

Second Example Embodiment

In this example embodiment, the abnormality detection unit 34 detects a size of an abnormality in each detected abnormal area. The abnormality detection unit 34 can calculate a size of the abnormality by performing a Principal Component Analysis on the point cloud of each detected abnormal area and calculating a spread of the point cloud in the three-dimensional space. In the Principal Component Analysis, the eigenvector of the principal component is defined as the direction of the axis and the eigenvalue of the principal component is defined as the variance, and the XYZ axes are defined as a first principal component, a second principal component, and a third principal component in order from the axis having the largest variance.

Figure 7:
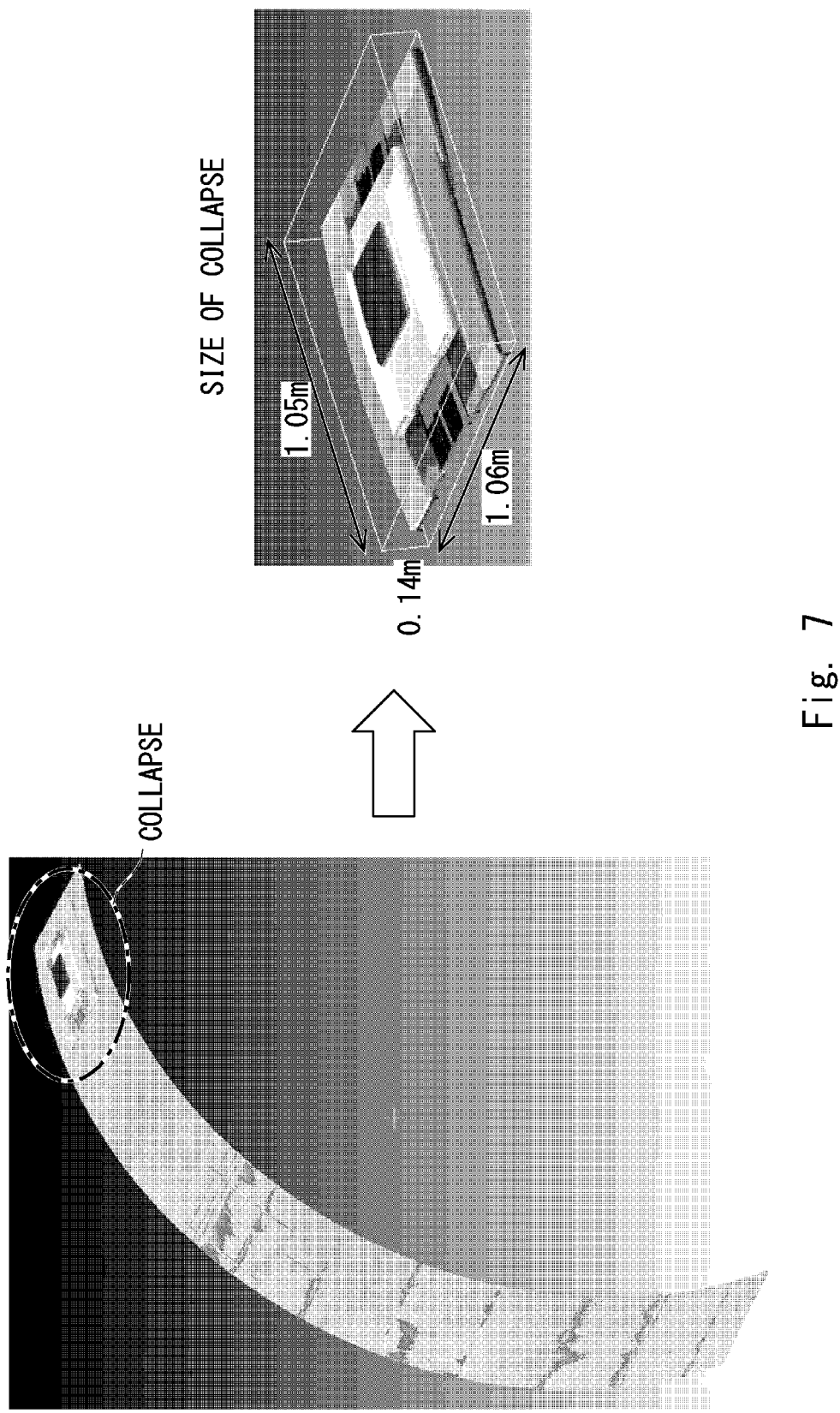
FIG. 7 is a diagram showing a size of a collapse of the inner wall surface of a tunnel in the three-dimensional direction.

For example, the abnormality detection unit 34 clusters each detected abnormal area. Next, the abnormality detection unit 34 calculates directions of the XYZ coordinate axes along the distribution of the point cloud by performing the Principal Component Analysis for each cluster obtained by the clustering of each detected abnormal area. The abnormality detection unit 34 calculates a size of the abnormality by calculating maximum and minimum values of the point cloud in each direction on the newly calculated XYZ coordinate axes. By doing so, it is possible, for example, as shown in FIG. 7, not only to detect a collapse of the inner wall surface of the tunnel but also to accurately detect the size (length: 1.06 m, width: 1.05 m, height: 0.14 m, etc.) of the collapse in the three-dimensional direction.

Several novel example embodiments according to the present invention have been described above. However, these example embodiments are merely presented as examples and are not intended to limit the scope of the invention. These novel example embodiments can be implemented in various forms. Further, their components/structures may be omitted, replaced, or modified without departing from the scope and the spirit of the invention. These example embodiments and modifications thereof are included in the scope and the spirit of the invention and also included in the invention specified in the claims and the scope equivalent thereto.

In the present invention, for example, the processes shown in FIG. 6 can also be implemented by causing a processor to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Each of the units composing the data processing apparatus 3 according to any of the above-described example embodiments is, in addition to being able to be implemented by the program, able to be partially or entirely implemented by dedicated hardware such as an Application Specific Integrated Circuit (ASIC) or a Field-Programmable Gate Array (FPGA).

REFERENCE SIGNS LIST

1 ABNORMALITY DETECTION SYSTEM
2 SHAPE DATA ACQUISITION APPARATUS
3 DATA PROCESSING APPARATUS
4 COMMUNICATION NETWORK
31 SURFACE DIRECTION CALCULATION UNIT
32 SHAPE DATA DIVISION UNIT
33 REFERENCE SHAPE CALCULATION UNIT
34 ABNORMALITY DETECTION UNIT

What is claimed is:

1. An abnormality detection system comprising:
a laser;
an optical sensor; and
a processor configured to:
control the laser to irradiate a surface of a tunnel with a laser beam;
control the optical sensor to obtain reflected luminance values corresponding to the laser beam;
acquire shape data of the surface of the tunnel using the reflected luminance values;
calculate a direction in which the surface is facing based on the shape data;
divide the shape data into a plurality of pieces based on the direction in which the surface is facing, the plurality of pieces comprising a side surface of an arch of the tunnel and a ceiling surface of the arch of the tunnel;
calculate a plurality of reference shapes respectively corresponding to the plurality of pieces of the shape data by projecting a three-dimensional point cloud of the shape data onto a plane for each of the plurality of pieces, the plurality of reference shapes comprising a first reference shape corresponding to the side surface of the arch of the tunnel and a second reference shape corresponding to the ceiling surface of the arch of the tunnel;
detect an abnormality on the surface of the tunnel based on a difference between each piece of the plurality of pieces of the shape data and the reference shape corresponding to each piece of the plurality of pieces of the shape data; and
provide a result of detection of the abnormality, the result of detecting indicating a defect in at least one of the plurality of pieces of the shape data.

2. The abnormality detection system according to claim 1, wherein the processor is further configured to:
calculate a normal vector of the surface of the tunnel as the direction in which the surface of the tunnel is facing based on the shape data of the surface of the tunnel, and
divide the shape data into the plurality of areas based on at least one of a horizontal component and a vertical component of the normal vector.

3. The abnormality detection system according to claim 1, wherein the processor is further configured to calculate at least one of an approximate plane, an approximate curved surface, an approximate straight line, and an approximate curve for each area of a plurality of areas of the plurality of pieces of the shape data to obtain the plurality of reference shapes.

4. The abnormality detection system according to claim 1, wherein the processor is further configured to calculate a least square error of each piece of the plurality of pieces of the shape data and the reference shape corresponding to each piece of the plurality of pieces of the shape data, and detect an area of the shape data where the least square error exceeds a threshold as the abnormality.

5. The abnormality detection system according to claim 1, wherein the processor is further configured to calculate a size of the abnormality by performing a principal component analysis on a point cloud of each of a plurality of detected abnormal areas and calculating a spread of the point cloud in a three-dimensional space.

6. An abnormality detection method comprising:
controlling a laser to irradiate a surface of a tunnel with a laser beam;
controlling an optical sensor to obtain reflected luminance values corresponding to the laser beam;
acquiring shape data of the surface of the tunnel using the reflected luminance values;
calculating a direction in which the surface is facing based on the shape data;
dividing the shape data into a plurality of pieces based on the direction in which the surface is facing, the plurality of pieces comprising a side surface of an arch of the tunnel and a ceiling surface of the arch of the tunnel;
calculating a plurality of reference shapes respectively corresponding to the plurality of pieces of the shape data by projecting a three-dimensional point cloud of the shape data onto a plane for each of the plurality of pieces, the plurality of reference shapes comprising a first reference shape corresponding to the side surface of the arch of the tunnel and a second reference shape corresponding to the ceiling surface of the arch of the tunnel;
detecting an abnormality on the surface of the tunnel based on a difference between each piece of the plurality of pieces of the shape data and the reference shape corresponding to each piece of the plurality of pieces of the shape data; and
providing a result of detection of the abnormality, the result of detecting indicating a defect in at least one of the plurality of pieces of the shape data.

7. A non-transitory computer readable medium storing a program for causing a computer to perform:
a process of controlling a laser to irradiate a surface of a tunnel with a laser beam;
a processor of controlling an optical sensor to obtain reflected luminance values corresponding to the laser beam;
a process of acquiring shape data of a surface of a tunnel using the reflected luminance values;
a process of calculating a direction in which the surface is facing based on the shape data;
a process of dividing the shape data into a plurality of pieces based on the direction in which the surface is facing, the plurality of pieces comprising a side surface of an arch of the tunnel and a ceiling surface of the arch of the tunnel;
a process of calculating a plurality of reference shapes respectively corresponding to the plurality of pieces of the shape data by projecting a three-dimensional point cloud of the shape data onto a plane for each of the plurality of pieces, the plurality of reference shapes comprising a first reference shape corresponding to the side surface of the arch of the tunnel and a second reference shape corresponding to the ceiling surface of the arch of the tunnel;

a process of detecting an abnormality on the surface of the 5 tunnel based on a difference between each piece of the plurality of pieces of the shape data and the reference shape corresponding to each piece of the plurality of pieces of the shape data; and a processor of providing a result of detection of the 10 abnormality, the result of detecting indicating a defect in at least one of the plurality of pieces of the shape data.

* * * * *